(12) United States Patent
Rado

(10) Patent No.: US 7,063,291 B2
(45) Date of Patent: Jun. 20, 2006

(54) AMPHIBIAN DELTA WING JET AIRCRAFT

(76) Inventor: Kenneth S. Rado, 1957 Bronxdale Ave., Apt. C-36, Bronx, NY (US) 10462

( * ) Notice: Subject to any disclaimer, the term of this patent is extended or adjusted under 35 U.S.C. 154(b) by 37 days.

(21) Appl. No.: 10/853,689

(22) Filed: May 25, 2004

(65) Prior Publication Data

US 2005/0279878 A1    Dec. 22, 2005

(51) Int. Cl.
   *B64C 35/02* (2006.01)
(52) U.S. Cl. .................. 244/106; 244/101; 244/49
(58) Field of Classification Search ............. 244/6, 244/7 R, 101, 105, 106, 107, 49, 45 R, 2; 446/34, 57
   See application file for complete search history.

(56) References Cited

U.S. PATENT DOCUMENTS

| | | | |
|---|---|---|---|
| 3,204,892 A * | 9/1965 | Powell | 244/218 |
| 3,606,208 A * | 9/1971 | Postelson-Apostolescu | 244/7 R |
| 3,743,218 A * | 7/1973 | Sweeney et al. | 244/36 |
| 3,854,679 A | 12/1974 | Smethers, Jr. | |
| 3,981,460 A * | 9/1976 | Ratony | 244/13 |
| 4,579,297 A | 4/1986 | Ayoola | |
| 4,756,265 A | 7/1988 | Lane | |
| 6,343,964 B1 | 2/2002 | Mardikian | |
| 6,499,419 B1 | 12/2002 | Bussard | |
| 6,526,903 B1 | 3/2003 | Robinson et al. | |
| 2002/0162498 A1 | 11/2002 | Robinson et al. | |
| 2003/0139101 A1 | 7/2003 | Mardikian | |

* cited by examiner

*Primary Examiner*—Peter M. Poon
*Assistant Examiner*—T D. Collins
(74) *Attorney, Agent, or Firm*—Richard L. Miller

(57) ABSTRACT

An amphibian delta wing jet aircraft, which has a plurality of triangular folding wing panels, two of which are hingedly attached to a lifting shape body, which incorporates a W-shaped hull in it's cross section of a fuselage so that the craft operates efficiently as an aircraft when flying through the air with the wings in a fully unfolded extended position. The craft also performs well as a watercraft capable of relatively high speeds on the water surface when the wing are folded-up in a non extended position. The W-shape hull transverse cross section also provides excellent characteristics so that the craft can hydroplane over marshlands or waterlogged soil which may be covered with emersed rushes, or snow, cattails and other tall grasses. The craft is also provided with four retractably mounted mechanically extendable wheels, to be utilized when configured as a land vehicle.

18 Claims, 6 Drawing Sheets

AMPHIBIAN DELTA WING JET AIRCRAFT

BACKGROUND OF THE INVENTION

1. Field of the Invention

The present invention relates to an amphibian delta wing jet aircraft which is convertible between an airplane form, a watercraft form and land vehicle form.

2. Description of the Prior Art

Numerous innovations for a variety of multi-medium crafts have been provided in the prior art that will be described. Even though these innovations may be suitable for the specific individual purposes to which they address, accordingly they differ from the present invention.

A FIRST EXAMPLE, U.S. Pat. No. 3,854,679 to Smethers, Jr. teaches a water-based aircraft, either a flying boat or amphibian, features a catamaran hull blended with a wide fuselage. The resultant lateral stability in the water permits elimination of the traditional tip floats. Three engines, mounted two above the wing and one above the fuselage, minimize spray ingestion and engine-out directional stability problems both in the air and on the water. A V-tail is employed with the angle of attachment essentially bisecting the angularity between the wing and fuselage engine, thus avoiding jet engine efflux and effectively providing a high tail free of spray impingement. The V-tail is attached to twin boom fuselage extensions, which configuration also permits the spray ("rooster tail") thrown by the hulls to pass freely without impingement. Hydrofoils facilitate takeoffs and landings.

A SECOND EXAMPLE, U.S. Pat. No. 4,579,297 to Ayoola teaches Air, Land and Sea vehicle is convertible between aircraft form, road vehicle form and boat form. The conversion between aircraft form and road vehicle forms having (4) four tires as an automobile as well as a roadable vehicle structure that are movable outwardly for highway usage, and inwardly into stored position for the aircraft form or boat form, and having storage for the wing and tail assemblies which has a foldable section for this purpose. For conversion between aircraft form and board forms, the apparatus has a retractable or extendable water propeller as propelling means in the water, and parts arranged for steering. The wings and tail assemblies are moved inwardly into stored position including auto and aero tires moved inwardly into their water-leak-proof compartments. The conversion between boat form and aircraft forms having wings and tail assemblies as well as propelling structures that are movable outwardly for the flying form including winglifter to lift the wings upwardly for the sufficient clearance between the wing-level and the water-level in order to accommodate sufficient relative wind to propel the invention as a lift means, during water takeoff. The water-rudder will maintain a straight forward movement. The auto and aero engines operate until the invention takes off on the water, then, the automobile engine must be turned off. The water-propeller and rudder move inwardly into their compartments respectively.

A THIRD EXAMPLE, U.S. Pat. No. 4,756,265 to Lane teaches a thrust collar is disclosed for mounting around the upper portion of the propeller of an inboard/outboard engine. Each thrust collar supports a horizontal hydrofoil wing extending laterally from the collar. A second, similar wing can be provided on an opposing side of the collar. Where the collar is used in pairs on paired engines on a catamaran hull, a single hydrofoil wing can be supported between the thrust collars. The thrust collar is preferably used in conjunction with hull lifting structures. One hull mounted hydrofoil structure is supported at the lower end of the strut extending and includes a generally curvilinear gull-wing shaped lower surface. For V-type hulls, a pair of elongated mechanical lifting structures, symmetrically positioned on either side of the keel substantially in the vicinity of the keel are attached to the hull so as to extend generally traversedly to the sloping side surfaces of the hull intersecting at the keel. These lifting structures have a length many times greater than their maximum transverse dimension and preferably extend from a position approximately at midship beneath the hull to the stern of the hull. Retractable hydrofoil assemblies are described for drawing a strut supporting a hydrofoil wing into a boat or routing the strut upward into a tunnel beneath the boat in the case of a catamaran hull.

A FOURTH EXAMPLE, U.S. Pat. No. 6,343,964 B1 to Lane teaches a jet powered boat may be provided with a water monitor for fire fighting purposes. The conduit for the monitor is connected to an opening through the bottom of the hull to draw water vertically from beneath the hull. Two motors are provided in the boat. One motor is configured to propel water through the monitor conduit to the water monitor. The other motor is configured to propel water through a propulsion jet at the rear of the boat. In one embodiment, a second propulsion jet is provided at the rear of the boat, connected to the conduit for the water monitor. A baffle at the intersection of the second propulsion jet and the monitor conduit may be operated to selectively direct water to either the monitor or the propulsion jet. In this embodiment, the two motors may be placed symmetrically on either side of the longitudinal centerline of the boat. In another embodiment, in which one motor exclusively supplies water to the water monitor (without the second propulsion jet), the two motors may be placed fore and aft along the centerline of the boat. The hull of the jet powered boat is shaped with progressively shallower segments of the hull bottom spaced farther from the hull centerline to provide the directional stability of a "V" shape near the centerline, with a relatively flat shape near the sides of the hull for lateral stability. Debris screens may selectively be placed in the water intake openings through the hull to block pump-damaging debris.

A FIFTH EXAMPLE, U.S. Patent Application Publication No. 2002/0162498 A1 to Robinson et al. teaches a watercraft constructed according to the invention includes at least one hull according to the invention described in the grandparent and great-grandparent patent applications that issued as U.S. Pat. Nos. 6,314,903 and 6,250,245, which hull includes first and second channel defining structures connected to the hull that define a first channel on a port side of the hull with a forwardly facing first channel entrance and a second channel on a starboard side of the hull with a second forwardly facing channel entrance According to one aspect of the invention, the hull has a bow that extends to a vertical knife edge, and the first and second wing channel entrances are arranged to form a near horizontal knife edge at the deck level in order to enhance high speed operations. According to another aspect of the invention, there is provided an onboard air system for injecting air into the first and second channels in order to enhance high speed operation of the watercraft. The air system may include a blower powered by an on-deck auxiliary power unit, a blower powered by a main drive diesel or gas turbine, or components that divert exhaust from a jet engine main drive.

A SIXTH EXAMPLE, U.S. Pat. No. 6,499,419 B1 to Bussard teaches a monohull keel sail boat is provided with a bow foil structure, a keel foil structure and a stern foil structure. The bow, keel and stern foil structures have foils which may be moved to provide a variable angle of attack and thus variable lifting forces. The stern foil structure has a ladder foil arrangement and includes vertical struts to provide steering control thus replacing a conventional rudder. The three foil structures work in concert to lift the hull of the boat, but not the keel, completely out of the water so as to provide near listless sailing.

A SEVENTH EXAMPLE, U.S. Pat. No. 6,526,903 B2 to Robinson et al. teaches a watercraft constructed according to the invention includes at least one hull according to the invention described in the grandparent and great-grandparent patent applications that issued as U.S. Pat. Nos. 6,314,903 and 6,250,245, which hull includes first and second channel defining structures connected to the hull that define a first channel on a port side of the hull with a forwardly facing first channel entrance and a second channel on a starboard side of the hull with a second forwardly facing channel entrance. According to one aspect of the invention, the hull has a bow that extends to a vertical knife edge, and the first and second wing channel entrances are arranged to form a near horizontal knife edge at the deck level in order to enhance high speed operations. According to another aspect of the invention, there is provided an onboard air system for injecting air into the first and second channels in order to enhance high speed operation of the watercraft. The air system may include a blower powered by an on-deck auxiliary power unit, a blower powered by a main drive diesel or gas turbine, components that divert excess air from a main drive gas turbine, or components that divert exhaust from a jet engine main drive.

AN EIGHTH EXAMPLE, U.S. Patent Application Publication No. 2003/0139101 A1 to Mardikian teaches a boat has one or more jet pumps with appropriate water intakes and jet nozzles to drive the boat and one or more outboard motors to drive the boat. The boat may also have one or more hydroplane fins allowing the hull of the boat to be lifted out of the water for fast hydroplaning motion. The hydroplane fins are extendable and retractable and the one or more jet pumps and/or outboard motors are movably mounted and can be lowered so as to be disposed below the water level in efficient operating position even when the hydroplane fins are extended and the hull of the boar is lifted out of the water for fast hydroplaning motion.

SUMMARY OF THE INVENTION

AN OBJECT of the present invention is to provide an amphibian delta wing Jet aircraft that avoids the disadvantages of the prior art.

ANOTHER OBJECT of the present invention is to provide an amphibian delta wing Jet aircraft that is simple and inexpensive to manufacture.

STILL ANOTHER OBJECT of the present invention is to provide an amphibian delta wing jet aircraft that is simple to use.

BRIEFLY STATED, STILL YET ANOTHER OBJECT of the present invention is to provide an amphibian delta wing jet aircraft, which has a plurality of 1E triangular folding wing panels two of which are hingedly attached to a lifting shape body, which incorporates a W-shaped hull in its cross section of a fuselage so that the craft operates efficiently as an aircraft when flying through the air with the wings in a fully unfolded extended position. The craft also performs well as a watercraft capable of relatively high speeds on the water surface when the wings are folded-up in a non extended position. The W-shaped hull also provides excellent characteristics so that the craft can hydroplane over marshlands or waterlogged soil which may be covered with emersed rushes, cattails and other tall grasses, or on snow.

The craft is also provided with four retractably mounted mechanically extendable wheels, all of which are steerable.

The novel features which are considered characteristic of the present invention are set forth in the appended claims. The invention itself, however, both as to its construction and its method of operation, together with additional objects and advantages thereof, will be best understood from the following description of the specific embodiments when read and understood in connection with the accompanying drawings.

BRIEF DESCRIPTION OF THE DRAWING

The FIGS. of the drawings are briefly described as follows.

Figure 1:
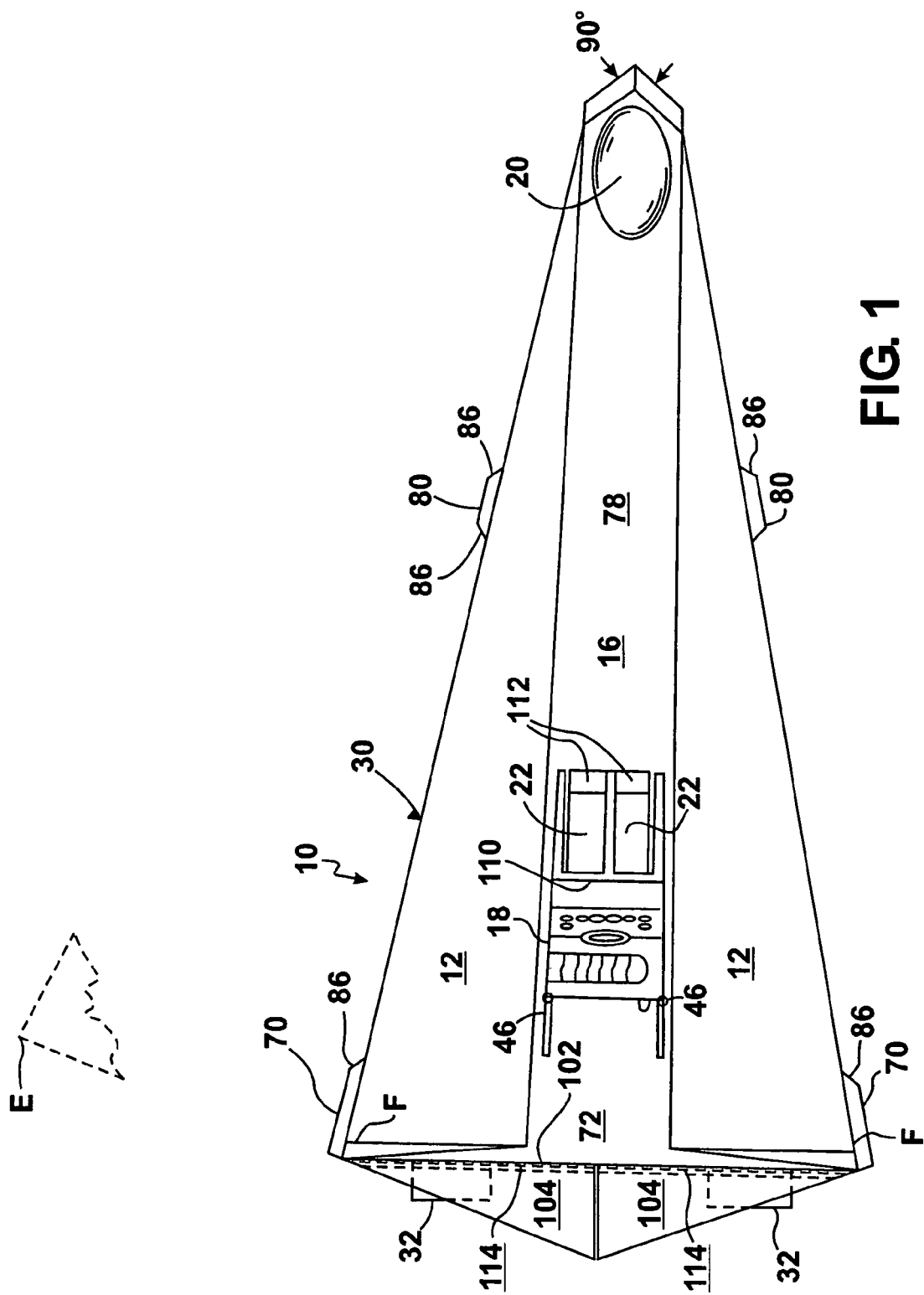
FIG. 1 is a diagrammatic top plan view of the craft with the wings in a fully folded position as they would be when the craft is configured to travel on the earth's surface, that is water, marshlands, roadways, snow, etcetera.

A MARSHALLING OF REFERENCE NUMERALS UTILIZED IN THE DRAWING 10 craft
12 pair of wings
14 deck surface
16 catwalk area
18 aft cockpit
20 bow cockpit
22 air intake openings
24 jet engines
26 body
28 fresh air
30 fuselage
32 jet exhaust ports
34 bench seat
36 steering wheel
38 instrument panel
40 rearwardly facing door
42 entrance handle
44 outer windshield
46 rear edge lines 46 of the aft cockpit 18
48 planar control surfaces
50 nose pyramid wedge shaped portion
52 triangular outboard section
54 triangular inboard section
56 first axial line
58 second axial line
60 extreme tip of the wing 12

62 arrows which show the intermediate path traversed by a tip of a second axial line 58
64 arrows which show the intermediate path traversed by the tip of the wing 60
66 rectangle
67 water line
68 two isosceles triangles
69 W-shape
70 two aft pods
72 extreme aft end of the body 26
74 rear wheel
76 retractably mounted telescopic mechanism for extending wheel 74
78 midship location
80 two forward pods
82 retractably mounted telescopic mechanism for extending wheel 84
84 front wheels
86 least one sloped face
88 two fins which protrude through the hull of the craft at a perpendicular
92 surface of the hull 68
94 aft distal end of each fin 88
96 rudder which is utilized for steering the craft 10, when configured as a water craft
98 interior portion 98 of the fin 88
100 axes at the aft distal end 94 of each fin 88
102 upper aft edge line
104 upper set of control surface
106 lower aft edge line
108 lower set of control surface
110 air-dam wall
112 air-flow channeling walls
114 butt plate rotation restrictors

DETAILED DESCRIPTION OF THE PREFERRED EMBODIMENT

Figure 2:
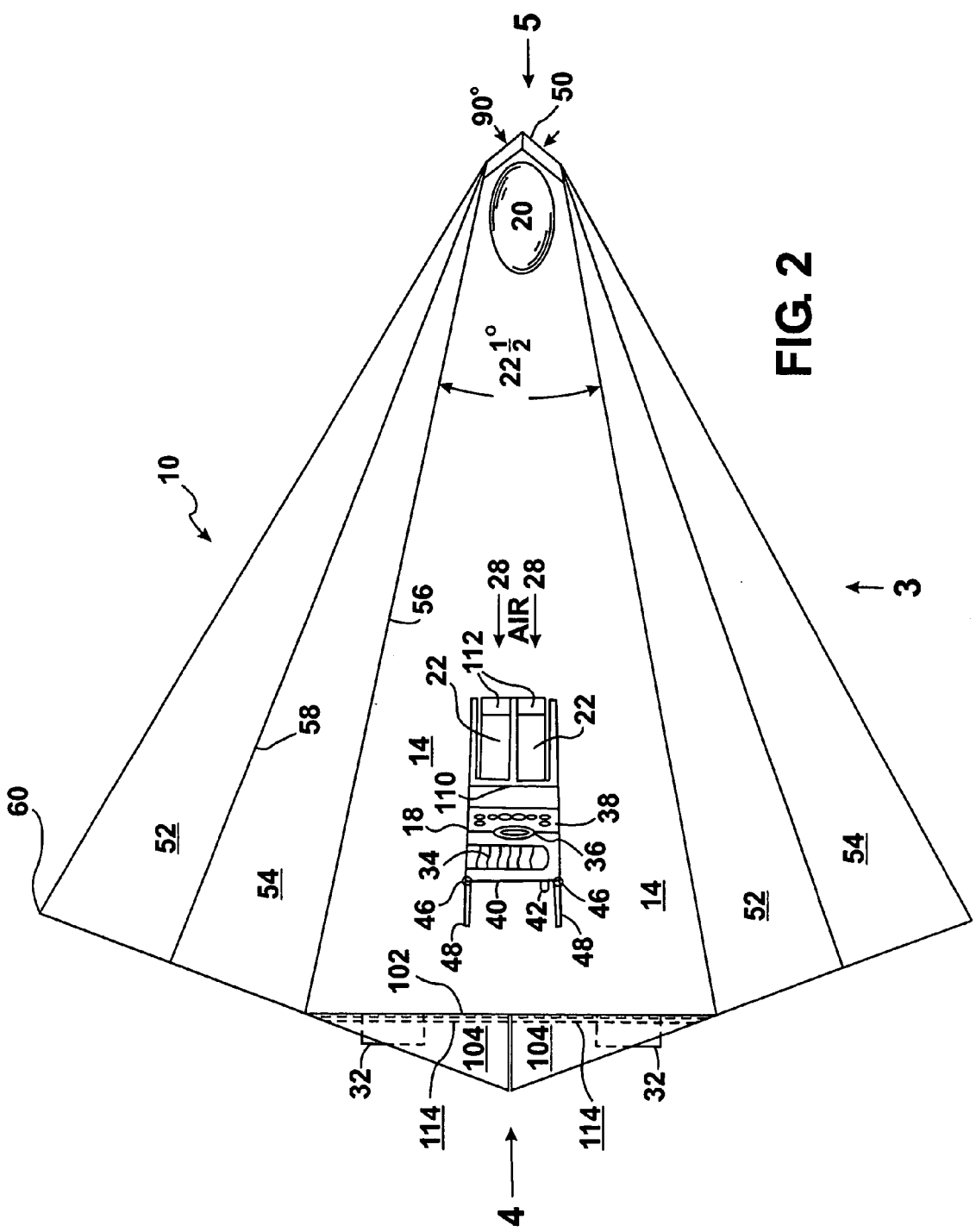
FIG. 2 is a diagrammatic top plan view of the craft with the wings in a fully unfolded position as they would be when the craft is configured as an air craft.

Referring now to the FIGS., in which like numerals indicate like parts, and particularly to FIGS. 1 and 2, a craft 10, is illustrated to have a pair of wings 12 which are shown folded in FIG. 1, and lay on a deck surface 14 shown in FIG. 2. When the wings are folded there is a catwalk area 16, formed from the deck surface 14 which is left exposed between the folded pair of wings 12 and a rearward located aft cockpit 18 and a forward optional secondary bow cockpit 20, both of which are housed within the body 26, upon which a pilot or captain (not shown) can walk on to travel between cockpits. The bow cockpit 20 is extremely useful when the craft is being used on the water's surface and it is required to position the craft carefully next to a dock or another craft. Flush in the deck just in front of the aft cockpit 18 are located dual air intake openings 22, for supplying fresh air 28 for each of two jet engines 24 housed within a body 26 of fuselage 30. The jet engine 24 fluidly communicates with jet exhaust ports 32 so as to supply the required thrusts for propelling the craft whether it is on land, water or airborne, or on snow.

Within the aft cockpit is seen a bench seat 34 for at least one captain, a steering wheel 36 and an instrument panel 38.

At the rear of the aft cockpit 18 is located a rearwardly facing door 40 having an entrance handle 42. A portion of the outer windshield 44 of the aft cockpit 18 is primarily formed out of a clear tough durable material so as to provide good visibility for the captain of the craft. At a rear edge lines 46 of the aft cockpit 18, are hingedly attached two planar control surfaces 48, each of which may be independently pivoted about the rear edge lines 46 so as to help control the direction of the craft when airborne. As shown in figure in phantom, both of control surfaces 48 may additionally be each simultaneously pivoted outwardly to act as an air brake when so desired.

The fuselage 30 of the craft 10 in plan elevation is substantially isosceles triangular shaped, with the equal sides having an angle of 22½ degrees there between, which is truncated at the apex with nose pyramid wedge shaped portion 50 having a more obtuse angle of 90 degrees at its apex.

Each pair of wings 12 is formed of a triangular outboard section 52, and a triangular inboard section 54 which are almost congruent. The triangular inboard section 54, is hingedly attached to an upper edge of the body 26 of fuselage 30, and folds along a first axial line 56 which substantial coincides with an upper edge of the body 26 of fuselage 30. The triangular outboard section 52 has an inner edge hingedly attached to an outer edge of the triangular inboard section 54 and folds along a second axial line 58 which separates the triangular outboard section 52 from the triangular inboard section 54.

Figure 4:
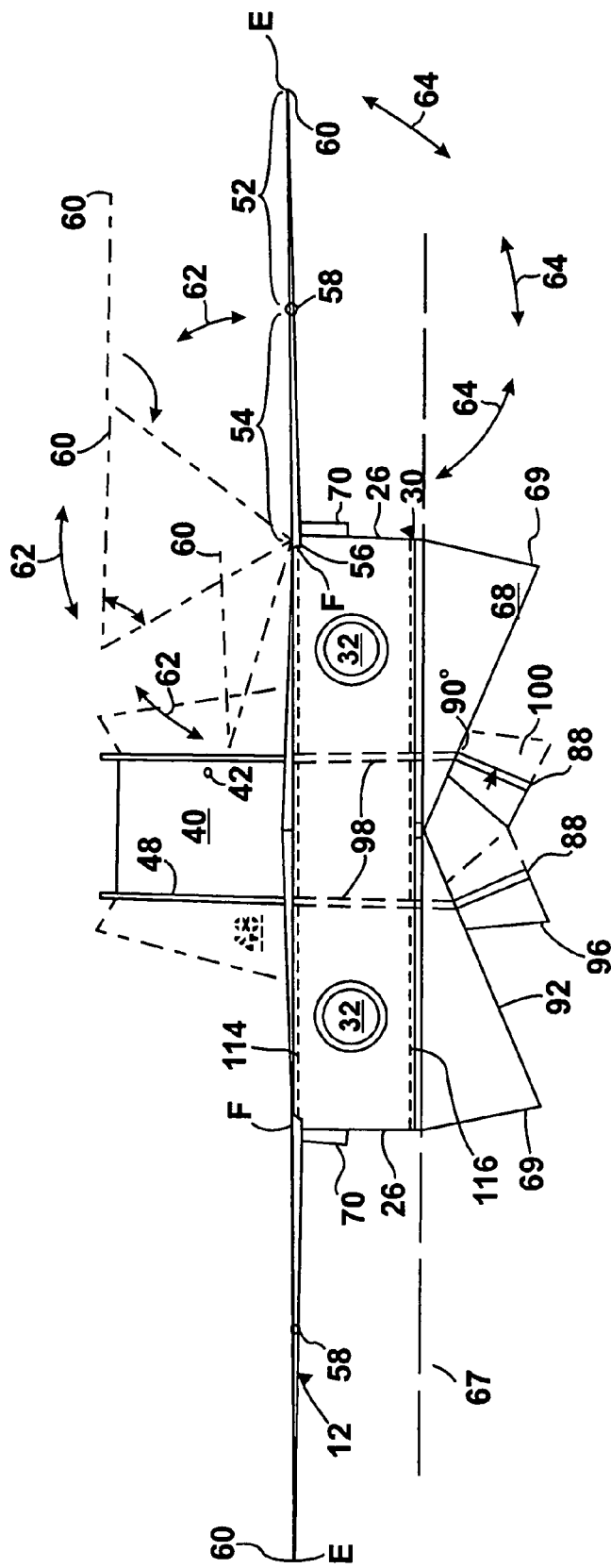
FIG. 4 is a diagrammatic rear elevational view of the craft, taken in the direction of arrow 4 in FIG. 2.
Figure 5:
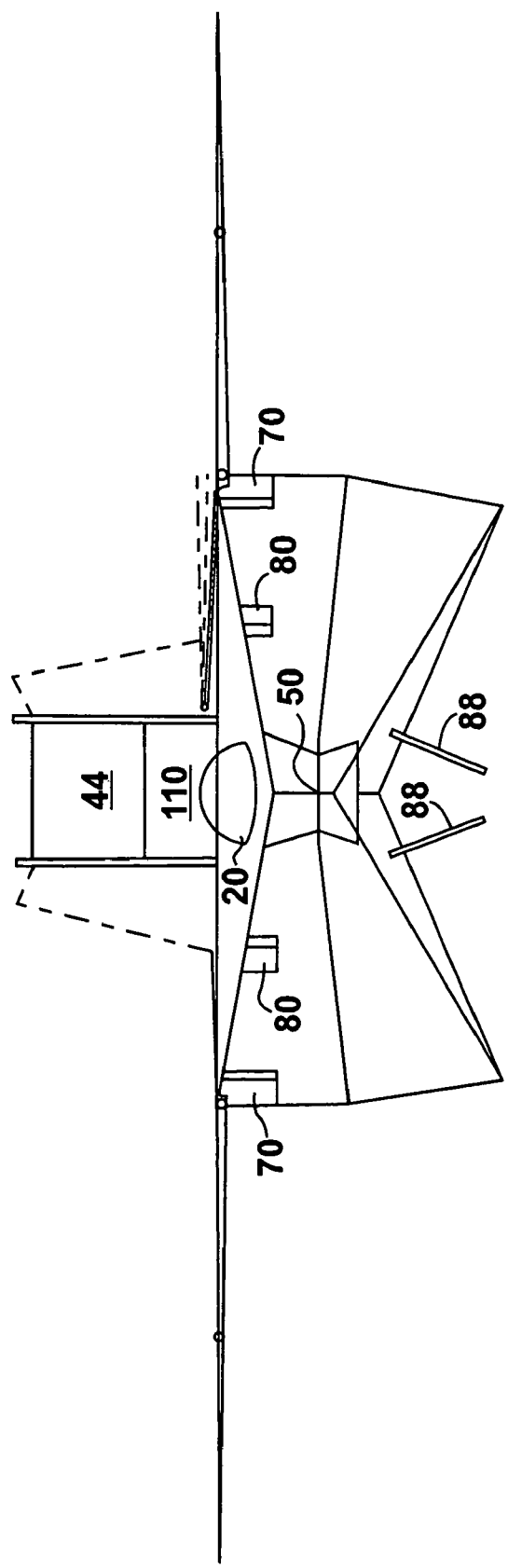
FIG. 5 is a diagrammatic front elevational view of the craft, taken in the direction of arrow 5 in FIG. 2.

As probably best seen in FIG. 4, when the wings 12 are fully extended, i.e. unfolded so the craft 10 is configured for flying through the atmosphere, the extreme tip 60 of the wing 12 resides at point "E".

Conversely, when the wings 12 are fully stored, i.e. folded so the craft 10 is configured for negotiating on the surface of a planet the extreme tip of the wing 60 resides at point "F".

In FIG. 4, arrows 62 show the intermediate path traversed by a tip of a second axial line 58, while arrows 64 show the intermediate path traversed by the tip of the wing 60, when the wing is in the process of being extended or folded.

Figure 6:
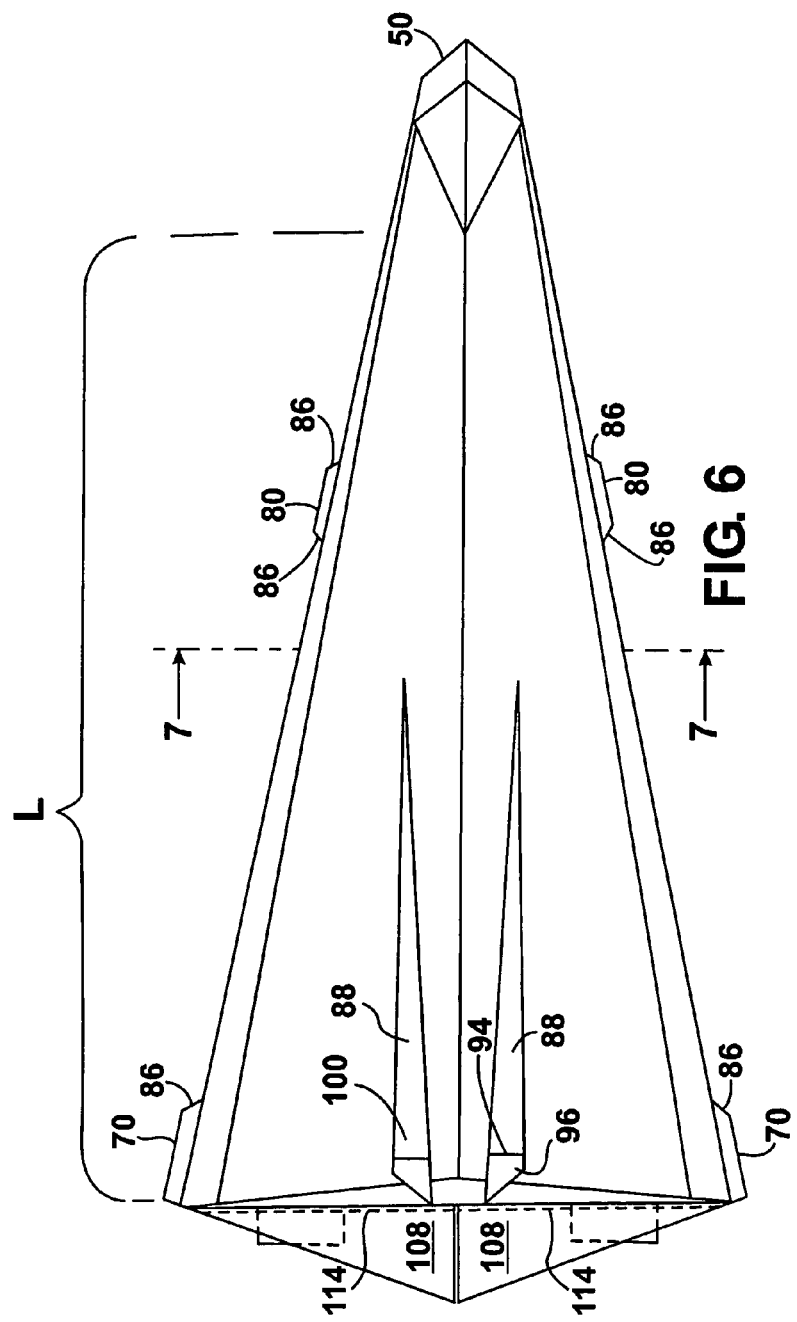
FIG. 6 is a diagrammatic bottom plan view of the craft, taken in the direction of arrow 6 in FIG. 3, but with the wings in a fully folded position, which best illustrates a set of combination dual rudders and water brakes, which are utilized when the craft is being operated as a water craft.
Figure 7:
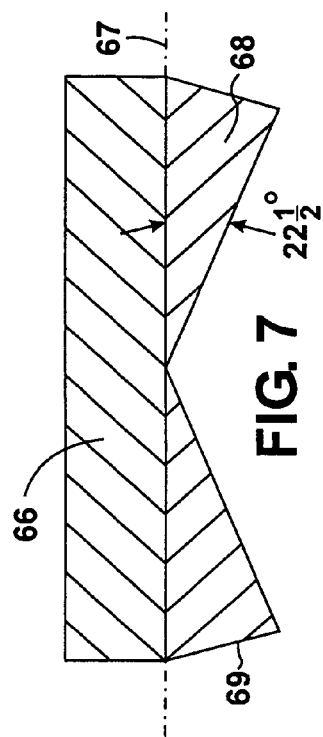
FIG. 7 is a diagrammatic cross sectional view taken along line 7—7 in FIG. 6 of just the fuselage of the craft per se.

As seen from examining FIG. 7 with reference to FIG. 6, a transverse cross sectional view of the fuselage of the craft taken on line 7—7 in FIG. 6, anywhere within the range indicated by brace "L" consists of two geometric shapes. Naturally, since the fuselage tapers along it's longitudinal axis this section will change in size depending at what cross section elevational point it is taken, however, the shapes will always be similar in accordance with theorems of Euclidean geometry. The cross section of the body of the fuselage is a rectangle 66 which abuts with the cross section of the hull which is two isosceles triangles 68 oriented with their apexes touching and each triangle having a long side in common with half of one side of the rectangle and coincident with a water line 67 for the craft 10 when configured as a water craft. Accordingly four of the sides of the isosceles triangles form a W-shape 69 in this cross sectional view and appropriately this W-shaped has been drawn in a heaver weight line so as to obviate this property.

As discernible in FIGS. 1, 3, 4, 5, and 6, at the extreme aft end 72 of the body 26 of the craft 10, there are fixedly attached, two aft pods 70 each of which house a retractably mounted telescopic mechanism 76 for extending wheel 74, which are steerable and motorized to propel the craft on land or other hard surfaces.

Also discernible in FIGS. 1, 3, 5, and 6, at a midship location 78, behind the bow cock 20, there are fixedly attached, two forward pods 80, each of which house a retractably mounted telescopic mechanism 82 for extending wheels 84, which are steerable and utilized to drive and steer the craft on land or other hard surfaces when configured as a land vehicle.

It should be noted that each pod 70, 80, has at least one sloped face 86 angled at approximately 45 degrees so as to facilitate the glancing off a pier while docking the craft when configured as a water craft.

As discernable in FIGS. 3, 4, 5 and 6 two fins 88 protrude through the hull of the craft at a perpendicular, to the surface 92 of the hull 68. An interior portion 98 of the fin 88 which passes through the hull and bends vertically so as to be perpendicular to the deck 14 and serves as a structural member to strengthen the craft 10.

On axes 100, at the aft distal end 94 of each fin 88, is pivotally attached, a rudder 96 which is utilized for steering the craft 10, when configured as a water craft. Alternatively rudders 96 can also be utilized for braking the craft's speed by bringing both rudders 96 together or apart, as best seen in FIG. 4.

Figure 3:
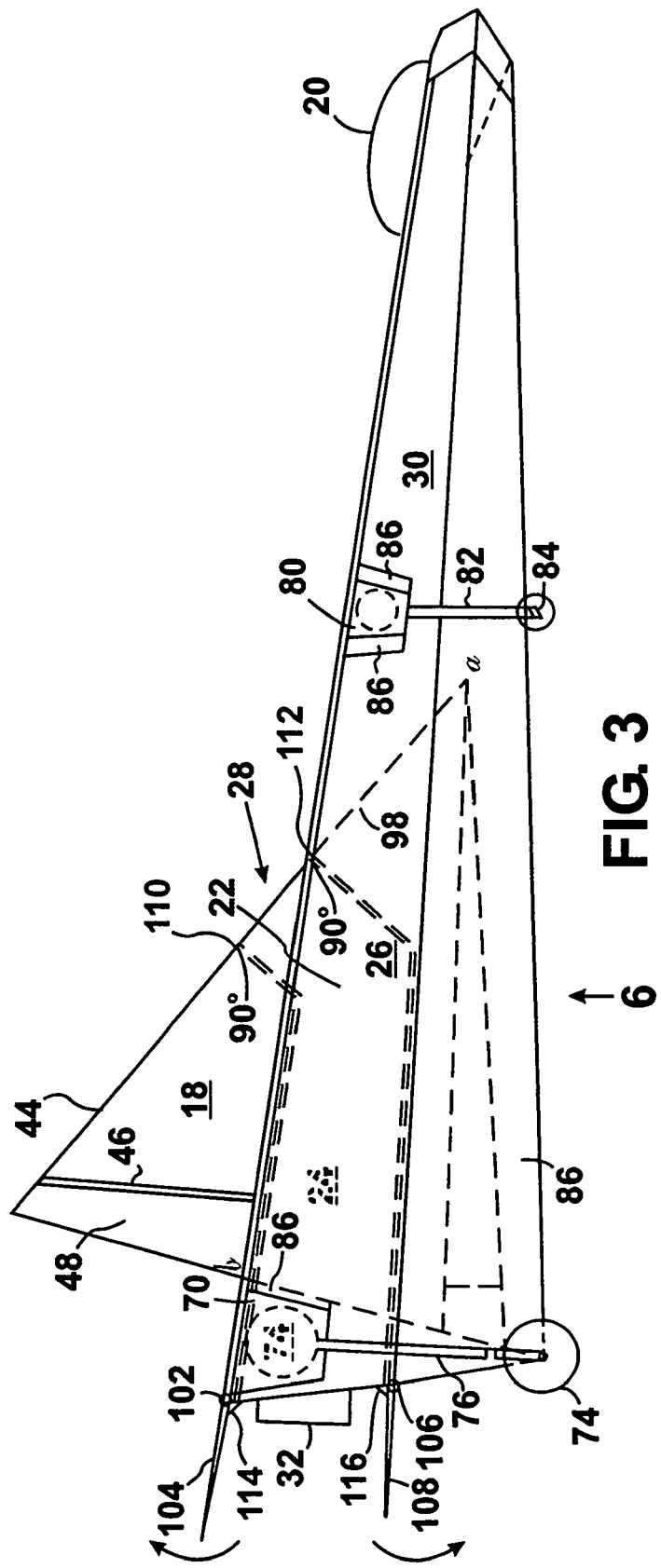
FIG. 3 is a diagrammatic right side elevational view of the craft, taken in the direction of arrow 3 in FIG. 2.

As best seen in FIGS. 1, 2, and 3 pivotally attached at an upper aft edge line 102 is an upper set of control surface 104. Similarly as best seen in FIGS. 3 and 6 pivotally attached at a lower aft edge line 106 is a lower set of control surface 108. These control surfaces can be independently moved and positioned so as to help control the longitudinal inclination and declination, lateral bank and yaw of the craft 10 when configured as an aircraft.

It will be understood that each of the elements described above, or two or more together, may also find a useful application in other types of constructions differing from the types described above.

While the invention has been illustrated and described as embodiments of an amphibian delta wing jet aircraft, accordingly it is not limited to the details shown, since it will be understood that various omissions, modifications, substitutions and changes in the forms and details of the device illustrated and its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute characteristics of the generic or specific aspects of this invention.

The invention claimed is:

1. An amphibian delta wing jet aircraft, which has a fuselage that can be configured as an airplane form, a water craft form, a snow craft form and a land vehicle form comprising:
   a) a body which tapers along a longitudinal axis and houses at least one jet engine and at least an aft cockpit;
   b) a hull which abuts said body and tapers along a longitudinal axis and has the characteristic of a lifting body;
   c) a plurality of triangular folding wing panels two of which are hingedly attached to said body, wherein said body houses said aft cockpit and a bow cockpit and there is a deck space left exposed between said cockpits and said plurality of triangular folding wing panels which form a catwalk area, upon which a pilot or captain can walk on to travel between said cockpits.

2. An amphibian delta wing jet aircraft, which has a fuselage that can be configured as an airplane form, a water craft form, a snow craft form and a land vehicle form comprising:
   a) a body which tapers along a longitudinal axis and houses at least one jet engine and at least an aft cockpit;
   b) a hull which abuts said body and tapers along a longitudinal axis and has the characteristic of a lifting body;
   c) a plurality of triangular folding wing panels two of which are hingedly attached to said body, wherein said body has a transverse cross section that is a rectangle, wherein said hull has a transverse cross section that is two isosceles triangles oriented with their apexes touching and each isosceles triangle having a long side in common with a half of a side of said rectangle.

3. The amphibian delta wing jet aircraft as defined in claim 2, wherein four of said sides of said isosceles triangles form a W-shape.

4. An amphibian delta wing jet aircraft, which has a fuselage that can be configured as an airplane form, a water craft form, a snow craft form and a land vehicle form comprising:
   a) a body which tapers along a longitudinal axis and houses at least one jet engine and at least an aft cockpit;
   a hull which abuts said body and tapers along a longitudinal axis and has the characteristic of a lifting body;
   b) a plurality of triangular folding wing panels two of which are hingedly attached to said body, wherein said plurality of triangular folding wing panels, form a triangular outboard section, and a triangular inboard section which are almost congruent.

5. The amphibian delta wing jet aircraft as defined in claim 4, wherein said triangular inboard section is hingedly attached to an upper edge of said body of said fuselage and folds along a first axial line which substantially coincides with an upper edge of said body of said fuselage.

6. The amphibian delta wing jet aircraft as defined in claim 5, wherein said triangular outboard section has an inner edge hingedly attached to an outer edge of said triangular inboard section and folds along a second axial line which separates said triangular outboard section from said triangular inboard section.

7. An amphibian delta wing jet aircraft, which has a fuselage that can be configured as an airplane form, a water craft form, a snow craft form and a land vehicle form comprising:
   a) a body which tapers along a longitudinal axis and houses at least one jet engine and at least an aft cockpit;
   b) a hull which abuts said body and tapers along a longitudinal axis and has the characteristic of a lifting body;
   c) a plurality of triangular folding wing panels two of which are hingedly attached to said body, wherein located at the extreme aft end of said body of said craft, there are fixedly attached two aft pods each of which house a retractably mounted telescopic mechanism for extending a wheel, which is steerable.

8. The amphibian delta wing jet aircraft as defined in claim 7, wherein said wheel is motorized, so as to propel the craft on land or other hard surfaces.

9. The amphibian delta wing jet aircraft as defined in claim 8, wherein said aft pods each have at least one sloped face angled so as to facilitate the glancing off a pier while docking the craft when configured as a water craft.

10. An amphibian delta wing jet aircraft, which has a fuselage that can be configured as an airplane form, a water craft form, a snow craft form and a land vehicle form comprising:
   a) a body which tapers along a longitudinal axis and houses at least one jet engine and at least an aft cockpit;

b) a hull which abuts said body and tapers along a longitudinal axis and has the characteristic of a lifting body;

c) a plurality of triangular folding wing panels two of which are hingedly attached to said body, wherein located at a midship location, there are fixedly attached two forward pods each of which house a retractably mounted telescopic mechanism for extending a wheel which is steerable and utilized to drive and steer the craft on land or other hard surfaces when configured as a land vehicle.

11. The amphibian delta wing jet aircraft as defined in claim 10, wherein said forward pods each have at least one sloped face angled, so as to facilitate the glancing off a pier while docking the craft when configured as a water craft.

12. The amphibian delta wing jet aircraft as defined in claim 1, wherein between said bow cockpit and said aft cockpit is located dual air intake openings for supplying fresh air for each of two jet engines housed within said body of said fuselage.

13. The amphibian delta wing jet aircraft as defined in claim 12, wherein said two jet engines fluidly communicate with jet exhaust ports so as to supply required thrust for propelling the craft whether it is configured for land, water or air or snow.

14. An amphibian delta wing jet aircraft, which has a fuselage that can be configured as an airplane form, a water craft form, a snow craft form and a land vehicle form comprising:

a) a body which tapers along a longitudinal axis and houses at least one jet engine and at least an aft cockpit;

b) a hull which abuts said body and tapers along a longitudinal axis and has the characteristic of a lifting body;

c) a plurality of triangular folding wing panels two of which are hingedly attached to said body, wherein two fins protrude through said hull of said craft at a perpendicular to a surface of said hull.

15. The amphibian delta wing jet aircraft as defined in claim 13, wherein an interior portion of said fin passes through said hull and bends vertically so as to be perpendicular to said deck 14, and serves as a structural member to strengthen the craft.

16. The amphibian delta wing jet aircraft as defined in claim 13, wherein on axes at an aft distal end of said each fin is pivotally attached a rudder, which is utilized for steering the craft, when configured as a water craft and alternatively also utilized for braking the crafts speed by bringing both rudders together, or apart.

17. The amphibian delta wing jet aircraft as defined in claim 1, wherein with respect to the ground when the craft is sitting on the ground on its wheels, or when it is rolling on the ground in the land vehicle mode, pivotally attached at a lower aft edge line of said hull is a lower set of control surfaces, wherein said lower set of control surfaces can be independently moved and positioned so as to help control the longitudinal declination, lateral bank and yaw of the craft when configured as an aircraft.

18. The amphibian delta wing jet aircraft as defined in claim 1, wherein with respect to the ground when the craft is sitting on the ground on its wheels, or when it is rolling on the ground in the land vehicle mode, pivotally attached at an upper aft edge line of said hull is an upper set of control surfaces, wherein said upper set of control surfaces can be independently moved and positioned so as to help control the longitudinal inclination, lateral bank and yaw of the craft when configured as an aircraft.

* * * * *